(12) United States Patent
Kamatani et al.

(10) Patent No.: US 11,518,081 B2
(45) Date of Patent: Dec. 6, 2022

(54) METHOD AND APPARATUS FOR MANUFACTURING FILM STRUCTURE

(71) Applicant: Panasonic Intellectual Property Management Co., Ltd., Osaka (JP)

(72) Inventors: Junichi Kamatani, Osaka (JP); Yuji Yamamoto, Osaka (JP); Nobuyuki Kamikihara, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 528 days.

(21) Appl. No.: 16/792,620

(22) Filed: Feb. 17, 2020

(65) Prior Publication Data
US 2020/0290264 A1    Sep. 17, 2020

(30) Foreign Application Priority Data

Mar. 11, 2019    (JP) .............................. JP2019-043832

(51) Int. Cl.
*B29C 59/04*    (2006.01)
*B21B 38/08*    (2006.01)
(Continued)

(52) U.S. Cl.
CPC .............. *B29C 59/04* (2013.01); *B21B 38/08* (2013.01); *B32B 27/26* (2013.01); *B41J 11/04* (2013.01);
(Continued)

(58) Field of Classification Search
None
See application file for complete search history.

(56) References Cited

FOREIGN PATENT DOCUMENTS

| JP | 2011-212878 | 10/2011 |
|----|-------------|---------|
| JP | 4976868 B   | 7/2012  |

(Continued)

OTHER PUBLICATIONS

Makela et al., Continuous Double-sided Roll-to-Roll Imprinting of Polymer Film, Japanese Journal of Applied Physics, vol. 47, No. 6, 2008, pp. 5142-5144 (Year: 2008).*

*Primary Examiner* — Joshua D Zimmerman
(74) *Attorney, Agent, or Firm* — Wenderoth, Lind & Ponack, L.L.P.

(57)    ABSTRACT

A method for manufacturing a film structure includes: a positional deviation amount detection process of detecting an amount of positional deviation related to a relative position of a second cured film formed on a rear surface of a film with respect to a first cured film formed on a front surface of the film; a relative position adjustment process of correcting a position or a rotation speed of a second transfer roll to adjust the relative position such that the amount of positional deviation detected in the positional deviation amount detection process is reduced; a first tensile force detection process and a second tensile force detection process of respectively detecting a tensile force of the film between a first pressurizing roll and a second pressurizing roll before and after the relative position adjustment process; and a tensile force adjustment process of adjusting the tensile force of the film such that the tensile force of the film detected in the second tensile force detection process approaches the tensile force of the film detected in the first tensile force detection process.

14 Claims, 5 Drawing Sheets

(51) Int. Cl.
    *B32B 27/26*     (2006.01)
    *B29C 35/08*     (2006.01)
    *B41J 11/42*     (2006.01)
    *B41J 11/04*     (2006.01)

(52) U.S. Cl.
    CPC ....... *B41J 11/42* (2013.01); *B29C 2035/0827* (2013.01)

(56) References Cited

FOREIGN PATENT DOCUMENTS

| | | | |
|---|---|---|---|
| JP | 2019-025718 | | 2/2019 |
| JP | 2019025718 A | * | 2/2019 |

* cited by examiner

METHOD AND APPARATUS FOR MANUFACTURING FILM STRUCTURE

TECHNICAL FIELD

The technical field relates to a method and apparatus for manufacturing a film structure using an imprint technology.

BACKGROUND

The imprint technology is a technology of forming a cured film to which a fine shape is transferred by pressing a mold with a surface with a fine shape worked thereon in advance against a resin applied to a surface of a base material. Examples of the imprint method include a thermal imprint method and a UV imprint method.

The thermal imprint method is a method for obtaining a cured film to which a fine shape is transferred by pressing a mold heated to a temperature that is equal to or greater than a glass transition temperature against a thermoplastic resin applied to a surface of a base material. The UV imprint method is a method for obtaining a cured film to which a fine shape is transferred by irradiating an ultraviolet curable resin applied to a surface of a base material with UV light in a state in which a mold at an ordinary temperature is pressed against the ultraviolet curable resin.

In a case in which a target base material is a film of PET or the like, a scheme of transferring a fine shape to the film at the same time with feeding of the film using a roll-shaped mold with a surface with a fine shape formed thereon is typically employed. The aforementioned scheme is known to have a high throughput and is called a roll-to-roll imprint method.

A typical process for forming a fine shape on the basis of the roll-to-roll imprint scheme of the UV imprint method will be described (see Japanese Patent No. 4976868).

According to a typical roll-to-roll imprint scheme based on the UV imprint method (roll-to-roll UV imprint scheme), a transfer material is extruded from an application unit and is applied onto a successively traveling film (film base material). Then, the film passes between a transfer roll with a surface with a transfer shape (fine shape) formed thereon and a pressurizing roll that is pressed against the transfer roll with a predetermined pressurizing force. In this manner, the transfer shape (fine unevenness) on the surface of the transfer roll is filled with the transfer material.

Next, the transfer roll is irradiated with UV light from a UV light source, thereby curing the transfer material in a state in which the transfer shape is filled with the transfer material. Finally, the film passes between a mold releasing roll and the transfer roll and travels along the mold releasing roll. In this manner, the film is separated from the transfer roll, and a cured film to which the transfer shape has been transferred is formed on the film.

This scheme is a scheme of forming a cured film on one surface of the film base material, and in a case in which it is necessary to form cured films on both surfaces of the film base material, it is necessary to perform a similar process on the other surface of the film base material as well.

SUMMARY

However, in a case in which cured films are formed on both surfaces of the film, an improvement in precision of relative positions between the cured films on both the surfaces of the film is required.

Thus, an object of the disclosure is to provide a method and an apparatus for manufacturing a film structure capable of improving precision of relative positions of cured films on both surfaces of a film while securing transfer quality on both the surfaces of the film.

In order to achieve the aforementioned object, there is provided a method for manufacturing a film structure obtained by transferring a transfer material to both surfaces of a successively traveling film and curing the transfer material, the method including: a first application process of applying the transfer material containing an ultraviolet curable resin to a front surface of the film; a first curing process of pressurizing the front surface of the film against a first transfer roll with a first pressurizing roll and curing the transfer material applied to the front surface of the film with ultraviolet rays, thereby forming a first cured film; a second application process of applying the transfer material containing an ultraviolet curable resin to a rear surface of the film; a second curing process of pressurizing the rear surface of the film against a second transfer roll with a second pressurizing roll and curing the transfer material applied to the rear surface of the film with ultraviolet rays, thereby forming a second cured film; a positional deviation amount detection process of detecting an amount of positional deviation related to a relative position of the second cured film with respect to the first cured film; a relative position adjustment process of correcting a position or a rotation speed of the second transfer roll to adjust the relative position such that the amount of positional deviation detected in the positional deviation amount detection process is reduced; a first tensile force detection process and a second tensile force detection process of respectively detecting a tensile force of the film between the first pressurizing roll and the second pressurizing roll before and after the relative position adjustment process; and a tensile force adjustment process of adjusting the tensile force of the film such that the tensile force of the film detected in the second tensile force detection process approaches the tensile force of the film detected in the first tensile force detection process, according to the disclosure.

According to the disclosure, there is provided an apparatus for manufacturing a film structure obtained by transferring a transfer material to both surfaces of a successively traveling film and curing the transfer material, the apparatus including: a first application unit and a second application unit that respectively apply the transfer material containing an ultraviolet curable resin to the film; a first transfer roll and a second transfer roll that respectively have transfer shapes on front surfaces thereof; a first pressurizing roll that pressurizes the transfer material applied to a front surface of the film by the first application unit against the first transfer roll; a first curing section that cures the transfer material pressurized by the first pressurizing roll with ultraviolet rays, thereby forming a first cured film; a second pressurizing roll that pressurizes the transfer material applied to a rear surface of the film by the second application unit against the second transfer roll; a second curing section that cures the transfer material pressurized by the second pressurizing roll with ultraviolet rays, thereby forming a second cured film; a positional deviation amount detection mechanism that detects an amount of positional deviation related to a relative position of the second cured film with respect to the first cured film; a correction mechanism that corrects a position or a rotation speed of the second transfer roll; a tensile force detection mechanism that detects a tensile force of the film between the first pressurizing roll and the second pressurizing roll; a tensile force adjustment mechanism that adjusts the tensile force of the film; and a control unit that controls the correction mechanism such that the amount of positional deviation is reduced and controls the tensile force adjustment mechanism such that the tensile force of the film detected by the tensile force detection mechanism after the correction performed by the correction mechanism approaches the tensile force of the film detected by the tensile force detection mechanism before the correction.

According to the method and apparatus for manufacturing a film structure of the disclosure, it is possible to improve precision of relative positions of cured films on both surfaces of a film while securing transfer quality on both the surfaces of the film.

DESCRIPTION OF EMBODIMENTS

Figure 1:
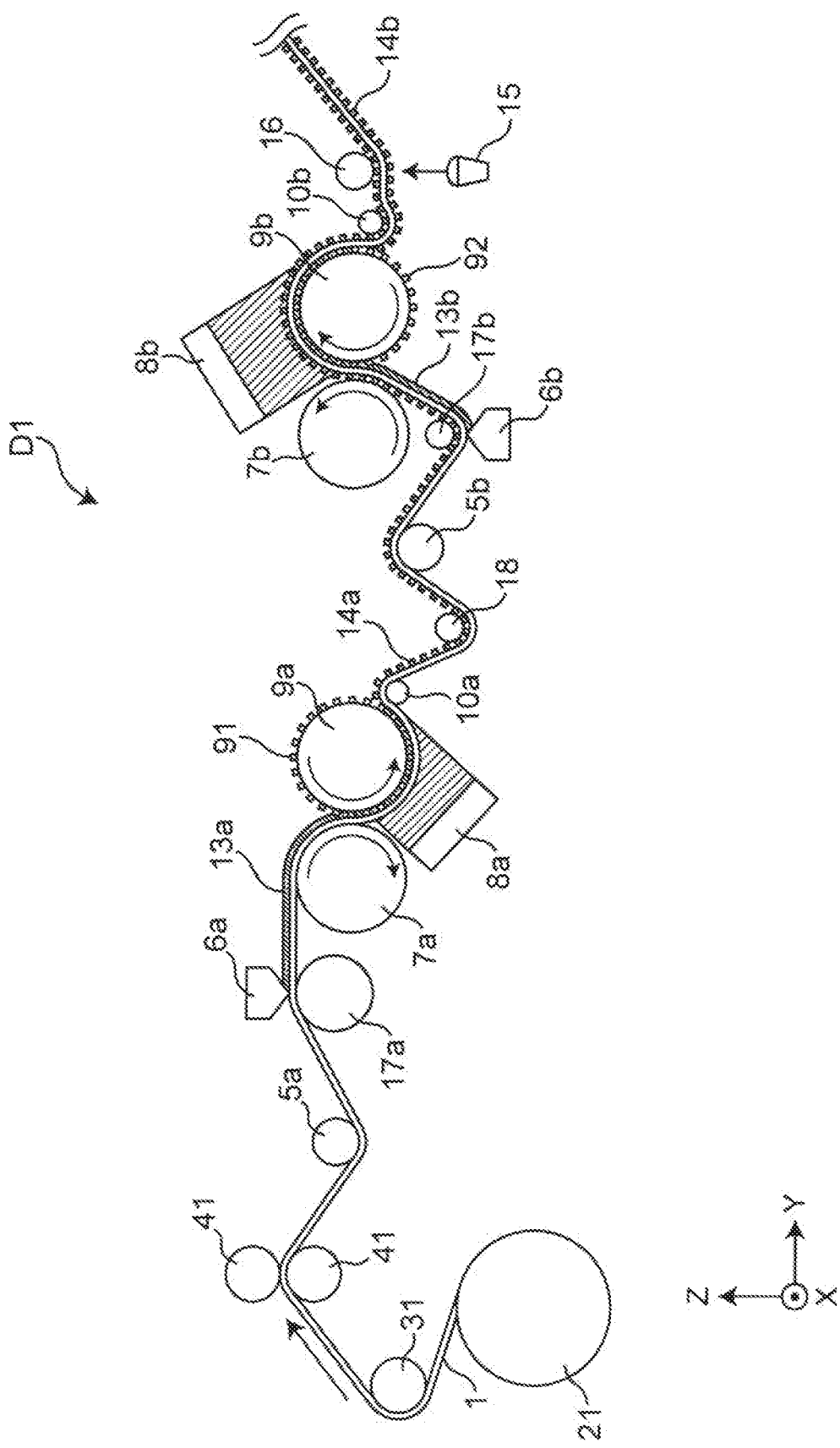
FIG. 1 is an outline view of an apparatus for manufacturing a film structure according to an embodiment of the disclosure.

According to a first aspect of the disclosure, there is provided a method for manufacturing a film structure obtained by transferring a transfer material to both surfaces of a successively traveling film and curing the transfer material, the method including: a first application process of applying the transfer material containing an ultraviolet curable resin to a front surface of the film; a first curing process of pressurizing the front surface of the film against a first transfer roll with a first pressurizing roll and curing the transfer material applied to the front surface of the film with ultraviolet rays, thereby forming a first cured film; a second application process of applying the transfer material containing an ultraviolet curable resin to a rear surface of the film; a second curing process of pressurizing the rear surface of the film against a second transfer roll with a second pressurizing roll and curing the transfer material applied to the rear surface of the film with ultraviolet rays, thereby forming a second cured film; a positional deviation amount detection process of detecting an amount of positional deviation related to a relative position of the second cured film with respect to the first cured film; a relative position adjustment process of correcting a position or a rotation speed of the second transfer roll to adjust the relative position such that the amount of positional deviation detected in the positional deviation amount detection process is reduced; a first tensile force detection process and a second tensile force detection process of respectively detecting a tensile force of the film between the first pressurizing roll and the second pressurizing roll before and after the relative position adjustment process; and a tensile force adjustment process of adjusting the tensile force of the film such that the tensile force of the film detected in the second tensile force detection process approaches the tensile force of the film detected in the first tensile force detection process, according to the disclosure.

According to a second aspect of the disclosure, the amount of positional deviation in a traveling direction of the film is reduced by correcting the rotation speed of the second transfer roll in the relative position adjustment process, in the method for manufacturing a film structure according to the first aspect.

According to a third aspect of the disclosure, the rotation speeds of the first transfer roll and the second transfer roll are synchronized, and in the relative position adjustment process, the amount of positional deviation in the traveling direction of the film is reduced by correcting the rotation speed of the second transfer roll in a state in which the synchronization of the rotation speeds of the first transfer roll and the second transfer roll is released when the rotation speed of the second transfer roll is corrected, in the method for manufacturing a film structure according to the second aspect.

According to a fourth aspect of the disclosure, the amount of positional deviation is reduced by correcting the position of the second transfer roll in the relative position adjustment process, in the method for manufacturing a film structure according to any one of the first to third aspects.

According to a fifth aspect of the disclosure, the amount of positional deviation in a width direction of the film is reduced by correcting the position of the second transfer roll in the width direction in the relative position adjustment process, in the method for manufacturing a film structure according to the fourth aspect.

According to a sixth aspect of the disclosure, the amount of positional deviation in the traveling direction of the film is reduced by correcting the position of the second transfer roll in a height direction and causing an outer circumferential surface of the second transfer roll to slip in the height direction relative to the transfer material applied to the rear surface of the film in the relative position adjustment process, in the method for manufacturing a film structure according to the fourth or fifth aspect.

According to a seventh aspect of the disclosure, the amount of positional deviation is reduced by causing an outer circumferential surface of the second transfer roll to slip above the transfer material applied to the rear surface of the film in the relative position adjustment process, in the method for manufacturing a film structure according to any one of the first to sixth aspects.

According to an eighth aspect of the disclosure, there is provided an apparatus for manufacturing a film structure obtained by transferring a transfer material to both surfaces of a successively traveling film and curing the transfer material, the apparatus including: a first application unit and a second application unit that respectively apply the transfer material containing an ultraviolet curable resin to the film; a first transfer roll and a second transfer roll that respectively have transfer shapes on front surfaces thereof; a first pressurizing roll that pressurizes the transfer material applied to a front surface of the film by the first application unit against the first transfer roll; a first curing section that cures the transfer material pressurized by the first pressurizing roll with ultraviolet rays, thereby forming a first cured film; a second pressurizing roll that pressurizes the transfer material applied to a rear surface of the film by the second application unit against the second transfer roll; a second curing section that cures the transfer material pressurized by the second pressurizing roll with ultraviolet rays, thereby forming a second cured film; a positional deviation amount detection mechanism that detects an amount of positional deviation related to a relative position of the second cured film with respect to the first cured film; a correction mechanism that corrects a position or a rotation speed of the second transfer roll; a tensile force detection mechanism that detects a tensile force of the film between the first pressurizing roll and the second pressurizing roll; a tensile force adjustment mechanism that adjusts the tensile force of the film; and a control unit that controls the correction mechanism such that the amount of positional deviation is reduced and controls the tensile force adjustment mechanism such that the tensile force of the film detected by the tensile force detection mechanism after the correction performed by the correction mechanism approaches the tensile force of the film detected by the tensile force detection mechanism before the correction.

According to a ninth aspect of the disclosure, the correction mechanism corrects the rotation speed of the second transfer roll, in the apparatus for manufacturing a film structure according to the eighth aspect.

According to a tenth aspect of the disclosure, the control unit causes rotation speeds of the first transfer roll and the second transfer roll to be synchronized and releases the synchronization of the rotation speeds of the first transfer roll and the second transfer roll when the rotation speed of the second transfer roll is corrected, in the apparatus for manufacturing a film structure according to the ninth aspect.

According to an eleventh aspect of the disclosure, the correction mechanism corrects the position of the second transfer roll, in the apparatus for manufacturing a film structure according to any one of the eighth to tenth aspects.

According to a twelfth aspect of the disclosure, the correction mechanism corrects the position of the second transfer roll in a width direction, in the apparatus for manufacturing a film structure according to the eleventh aspect.

According to a thirteenth aspect of the disclosure, the correction mechanism causes an outer circumferential surface of the second transfer roll to slip in a height direction relative to the transfer material applied to the rear surface of the film by correcting the position of the second transfer roll in the height direction, in the apparatus for manufacturing a film structure according to the eleventh or twelfth aspect.

EMBODIMENT

Hereinafter, an embodiment of the disclosure will be described with reference to drawings. Note that the disclosure is not limited to the following embodiment.

Figure 2:
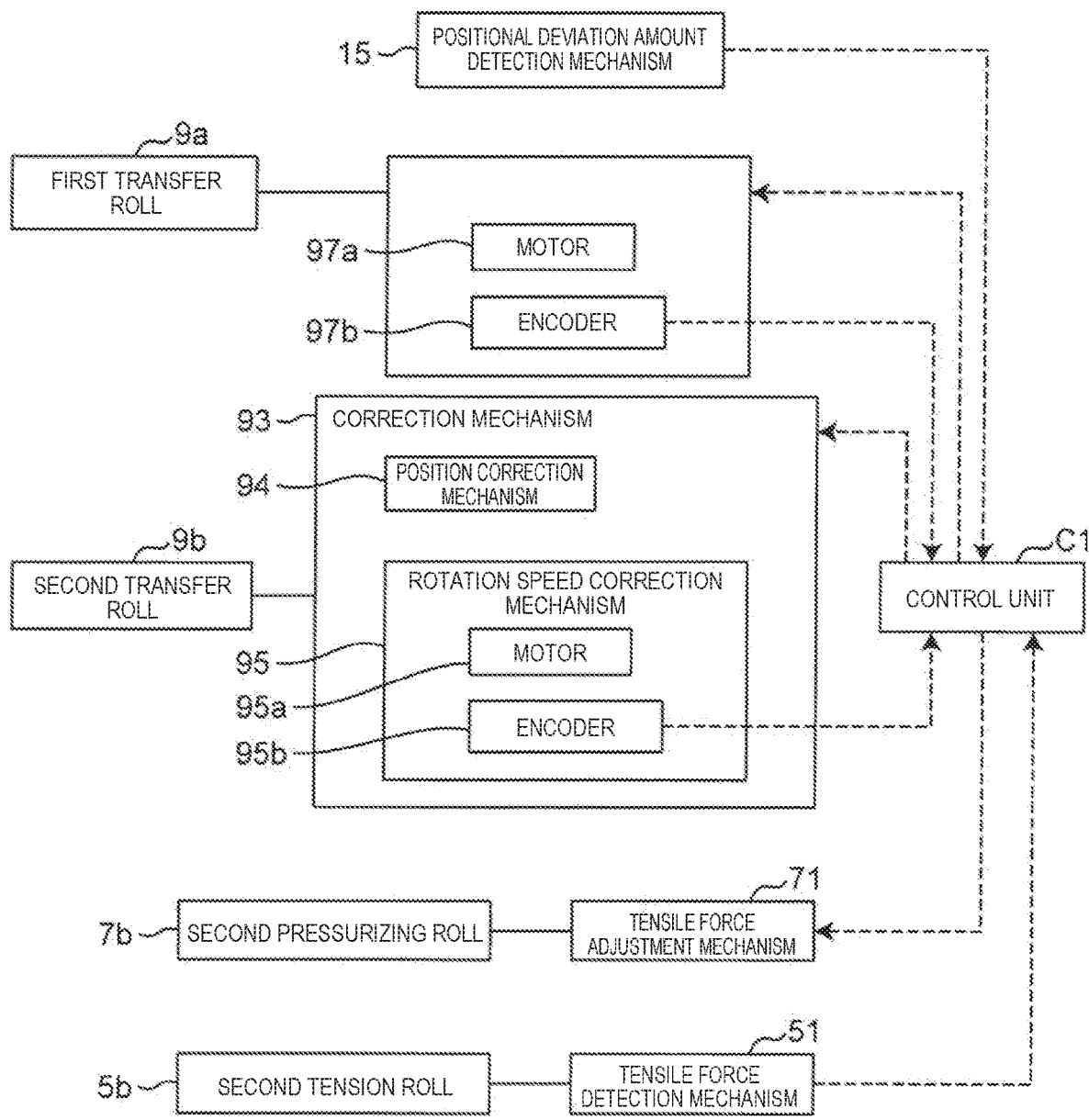
FIG. 2 is a control system diagram of the apparatus for manufacturing the film structure according to the embodiment of the disclosure.

First, a configuration of an apparatus D1 for manufacturing a film structure according to the embodiment will be described with reference to FIGS. 1 and 2. FIG. 1 is an outline perspective view of the manufacturing apparatus D1. FIG. 2 is a control system diagram of the manufacturing apparatus D1.

As Illustrated in FIG. 1, the apparatus D1 for manufacturing a film structure according to the embodiment is an apparatus for manufacturing a film structure obtained by transferring transfer materials 13a and 13b to both surfaces of a successively traveling film (film base material) 1 and curing the transfer materials 13a and 13b. Cured films 14a and 14b are formed on both the surfaces of the film 1. The transfer materials 13a and 13b are raw materials of the cured films 14a and 14b. In the embodiment, the transfer materials 13a and 13b are materials containing an ultraviolet curable resin. The transfer materials 13a and 13b are materials that have fluidity before curing and that are solidified after the curing, for example.

The manufacturing apparatus D1 includes a feeding roll 21, a guide roll 31, a pinch roll 41, a tension roll 5a, an application unit 6a, a coating roll 17a, a transfer roll 9a, a pressurizing roll 7a, a curing section 8a, and a mold releasing roll 10a. Further, the manufacturing apparatus D1 includes a guide roll 18, a tension roll 5b, an application unit 6b, a coating roll 17b, a transfer roll 9b, a pressurizing roll 7b, a curing section 8b, and a mold releasing roll 10b. Further, the control apparatus D1 includes a positional deviation amount detection mechanism 15, a positional deviation amount detection roll 16, and a control unit C1 (FIG. 2).

The feeding roll 21 is a roll that feeds the film 1 out to the downstream side in a transport direction of the film 1. The transport speed of the film 1 is equal to or greater than 0.1 m and equal to or less than 5 m per minute, for example. The thickness of the film 1 is equal to or greater than 20 µm and equal to or less than 300 µm, for example. The width of the film 1 is equal to or greater than 100 mm and equal to or less than 1 m, for example.

The guide rolls 18 and 31 are rolls that guide the film 1 to the downstream side. The pinch roll 41 is a roll that feeds the film 1 out to the downstream side. The pinch roll 41 controls a tensile force of the film 1. Specifically, the pinch roll 41 controls a tensile force of the film 1 when imprinting is performed on the front surface side of the film 1.

The tension rolls 5a and 5b are rolls that detect a tensile force imparted on the traveling film 1. The second tension roll 5b is provided further downstream than the first tension roll 5a. The second tension roll 5b is provided with a tensile force detection mechanism 51 (FIG. 2). The tensile force detection mechanism 51 is, for example, a load cell, and is a mechanism that detects a tensile force of the film 1 between the first pressurizing roll 7a and the second pressurizing roll 7b. The tensile force detection mechanism 51 can be, for example, a tension sensor or an encoder for calculating tensile force based upon tension sensors included in the tension rolls 5a, 5b. Information regarding the tensile force of the film 1 detected by the tensile force detection mechanism 51 is input to the control unit C1 (FIG. 2).

The application units (dye units) 6a and 6b are units that apply the transfer materials 13a and 13b to the film 1, respectively. The first application unit 6a applies the first transfer material 13a to the front surface of the film 1, and the second application unit 6b applies the second transfer material 13b to the rear surface of the film 1.

The coating rolls 17a and 17b are rollers that pinch the film 1 between the application units 6a and 6b, respectively. The first coating roll 17a pinches the film 1 with the first application unit 6a, and the second coating roll 17b pinches the film 1 with the second application unit 6b. It is possible to apply the transfer material 13a with a predetermined film thickness by controlling a gap between the application unit 6a and the film 1 on the first coating roll 17a. It is possible to apply the transfer material 13b with a predetermined film thickness by controlling a gap between the application unit 6b and the film 1 on the second coating roll 17b.

The transfer rolls (mold rolls) 9a and 9b are rollers (roll-shaped) with front surfaces (cylindrical outer circumferential surfaces) with transfer shapes (fine shapes) 91 and 92 formed thereon, respectively. The transfer rolls 9a and 9b transfer the transfer shapes 91 and 92 to the transfer materials 13a and 13b, respectively. The first transfer roll 9a transfers the transfer shape 91 to the first transfer material 13a, and the second transfer roll 9b transfers the transfer shape 92 to the second transfer material 13b.

The second transfer roll 9b is disposed further downstream than the first transfer roll 9a. The first transfer roll 9a is disposed downstream beyond the first application unit 6a and the first coating roll 17a, and the second transfer roll 9b is disposed downward beyond the second application unit 6b and the second coating roll 17b.

The diameters of the first transfer roll 9a and the second transfer roll 9b are substantially the same dimensions, for example. The diameters of the first transfer roll 9a and the second transfer roll 9b are equal to or greater than 100 mm and equal to or less than 300 mm, for example. The film thickness of the second transfer material 13b transferred by the second transfer roll 9b is equal to or greater than 0.5 μm and equal to or less than 10 μm, for example.

The first transfer roll 9a is provided with a motor 97a and an encoder 97b. In the embodiment, rotation of the first transfer roll 9a caused by the motor 97a is constant-speed rotation. The second transfer roll 9b rotates in synchronization with rotation speed information (angular signal) of the first transfer roll 9a detected by the encoder 97b.

The second transfer roll 9b is adjusted so as to be able to adjust relative positions of the cured films 14a and 14b with respect to the film 1 in order to reduce deviation of the relative position. Specifically, the second transfer roll 9b is configured to be able to adjust a relative position with respect to the second transfer material 13b applied to the rear surface of the film 1.

Figure 3:
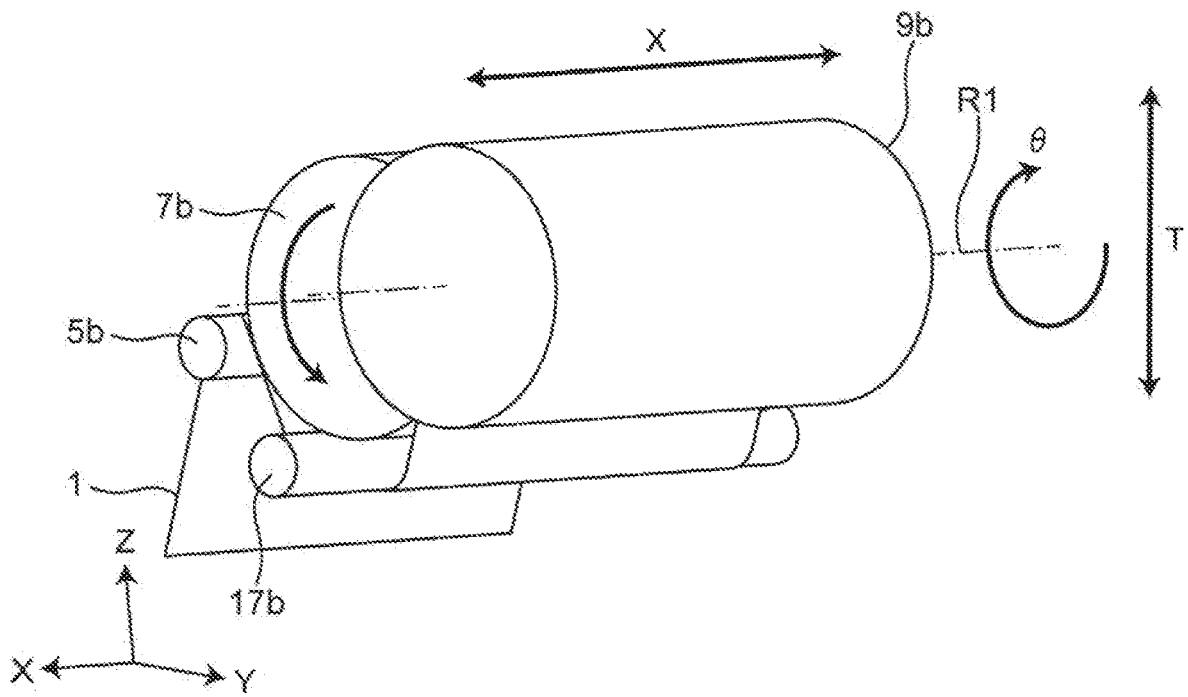
FIG. 3 is an outline schematic view illustrating a second transfer roll correction operation according to the embodiment of the disclosure.

FIG. 3 is an outline schematic view illustrating a correction operation for the second transfer roll 9b. As illustrated in FIG. 3, the position (an X direction and a T direction) and a rotation speed (a θ direction) of the second transfer roll 9b are corrected. The position and the rotation speed of the second transfer roll 9b are corrected by a correction mechanism 93 (FIG. 2). When the rotation speed of the second transfer roll 9b is corrected, synchronization of rotation speeds of the first transfer roll 9a and the second transfer roll 9b is released. The correction mechanism 93 will be described in detail later.

As illustrated in FIG. 1, the pressurizing rolls 7a and 7b are rollers that pressurize the film 1, to which the transfer materials 13a and 13b have been applied, against the transfer rolls 9a and 9b, respectively. The first pressurizing roll 7a pressurizes a front surface (first main surface) of the film 1, to which the first transfer material 13a has been applied, against the first transfer roll 9a. Specifically, the first pressurizing roll 7a comes into contact with a rear surface (second main surface) of the film 1 and pressurizes the front surface of the film 1 against the first transfer roll 9a. The second pressurizing roll 7b pressurizes the rear surface of the film 1, to which the second transfer material 13b has been applied, against the second transfer roll 9b. Specifically, the second pressurizing roll 7b comes into contact with the first cured film 14a formed on the front surface of the film 1 and pressurizes the rear surface of the film 1 against the second transfer roll 9b.

The first pressurizing roll 7a is provided such that an outer circumferential surface thereof faces the first transfer roll 9a, and the second pressurizing roll 7b is provided such that an outer circumferential surface thereof faces the second transfer roll 9b. In the embodiment, the pressurizing rolls 7a and 7b are provided so as to be aligned in the horizontal direction with respect to the transfer rolls 9a and 9b, respectively.

The diameters of the pressurizing rolls 7a and 7b and the transfer rolls 9a and 9b are substantially the same dimensions, for example. In this manner, it is possible to minimize a change in traveling direction of the film 1 (meandering of the film 1).

In the embodiment, the first pressurizing roll 7a is a roll (free roll) that is not provided with a drive source. That is, the first pressurizing roll 7a rotates with rotation of the first transfer roll 9a at the time of the pressurization. The second pressurizing roll 7b is provided with a tensile force adjustment mechanism 71, which will be described later. The second pressurizing roll 7b controls a tensile force of the film 1 when imprinting is performed on the rear surface side of the film 1.

The second pressurizing roll 7b is formed so as to be able to hold the second pressurizing roll 7b such that an outer circumferential surface thereof does not slip with respect to the first cured film 14a formed on the front surface of the film 1. A static friction coefficient of the outer circumferential surface of the second pressurizing roll 7b is equal to or greater than 0.2 and equal to or less than 0.7.

The curing sections 8a and 8b are sections that cure the transfer materials 13a and 13b, respectively. The first curing section 8a cures the first transfer material 13a pressurized by the first pressurizing roll 7a with ultraviolet rays, thereby forming the first cured film 14a. The second curing section 8b cures the second transfer material 13b pressurized by the second pressurizing roll 7b with ultraviolet rays, thereby forming the second cured film 14b. In the embodiment, the curing sections 8a and 8b are UV irradiation units (UV light sources) that irradiate the transfer materials 13a and 13b with ultraviolet rays (UV light), respectively.

The mold releasing rolls 10a and 10b are rollers that release the cured films 14a and 14b from the transfer rolls 9a and 9b, respectively. The first mold releasing roll 10a releases the first cured film 14a from the first transfer roll 9a, and the second mold releasing roll 10b releases the second cured film 14b from the second transfer roll 9b.

The positional deviation amount detection mechanism 15 is a mechanism that detects transfer positions of the first cured film 14a and the second cured film 14b. Specifically, the positional deviation amount detection mechanism 15 detects the amount of positional deviation related to a relative position of the second cured film 14b with respect to the first cured film 14a. The positional deviation amount detection mechanism 15 is, for example, a camera.

The positional deviation amount detection roll 16 is a roller that holds the film 1 when the positional deviation amount detection mechanism 15 performs detection. The positional deviation amount detection roll 16 is disposed so as to face the positional deviation amount detection mechanism 15.

The control unit C1 is a member that controls operation of the respective components in the manufacturing apparatus D1. The control unit C1 is, for example, a microcomputer or the like. The control unit C1 adjusts a tensile force of the film 1 and also corrects the position or the rotation speed of the second transfer roll 9b.

Next, the correction mechanism 93 of the second transfer roll 9b will be described in detail with reference to FIGS. 2 and 3.

The correction mechanism 93 of the second transfer roll 9b includes a position correction mechanism 94 and a rotation speed correction mechanism 95.

The position correction mechanism 94 is a mechanism that corrects the position of the second transfer roll 9b. Specifically, the position correction mechanism 94 corrects the position of the second transfer roll 9b with respect to the second pressurizing roll 7b. In the embodiment, the position correction mechanism 94 includes a motor that causes the position of the second transfer roll 9b to move in the width direction and the height direction, for example.

As illustrated in FIG. 3, the position correction mechanism 94 corrects the position of the second transfer roll 9b in the width direction (X direction), that is, the position thereof in an axial line direction. Further, the position correction mechanism 94 corrects the position of the second transfer roll 9b in the height direction (T direction). The correction operation in the height direction is performed by causing one side (the right side in FIG. 3) of the rotation axis R1 of the second transfer roll 9b in the width direction to move in the height direction. The other end side (the side in the +X direction) of the second transfer roll 9b is lowered if the one end side (the side in the −X direction) of the second transfer roll 9b is elevated, and the other end side of the second transfer roll 9b is elevated if the one end side of the second transfer roll 9b is lowered, for example, by the position correction mechanism 94.

The rotation speed correction mechanism 95 of the second transfer roll 9b is a mechanism that corrects the rotation speed of the second transfer roll 9b. The rotation speed correction mechanism 95 includes a motor 95a and an encoder 95b. The rotation speed correction mechanism 95 corrects the rotation speed of the motor 95a through the control unit C1 on the basis of rotation speed information (an angular signal during rotation) of the second transfer roll 9b detected by the encoder 95b. In this manner, the rotation speed correction mechanism 95 corrects the rotation speed of the second transfer roll 9b.

Figure 4:
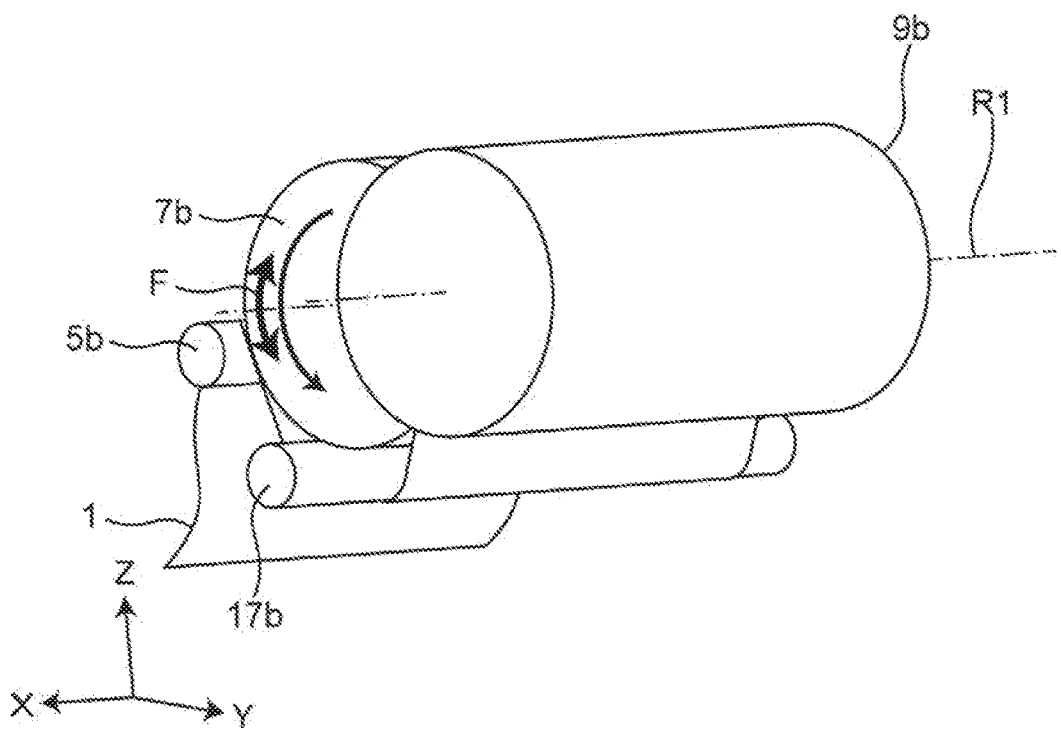
FIG. 4 is an outline schematic view illustrating a film tensile force adjustment operation according to the embodiment of the disclosure.

Next, adjustment of a tensile force of the film 1 will be described in detail with reference to FIGS. 2 and 4. FIG. 4 is an outline schematic view illustrating a tensile force adjustment operation for the film 1. Since the tensile force of the film 1 can be changed by the correction mechanism 93 of the second transfer roll 9b, the tensile force of the film 1 is adjusted.

As illustrated in FIG. 4, the tensile force of the film 1 is adjusted by adjusting a torque to be applied to the second pressurizing roll 7b. The torque to be applied to the second pressurizing roll 7b is adjusted by adjusting a force to be applied to the second pressurizing roll 7b in a direction F, for example. The torque to be applied to the second pressurizing roll 7b is adjusted by the tensile force adjustment mechanism 71 (FIG. 2) provided at the second pressurizing roll 7b. The tensile force adjustment mechanism 71 is a mechanism that adjusts the tensile force (tension) of the film 1. The tensile force adjustment mechanism 71 is a mechanism including a motor capable of controlling a torque, such as a torque motor, and an encoder.

Figure 5:
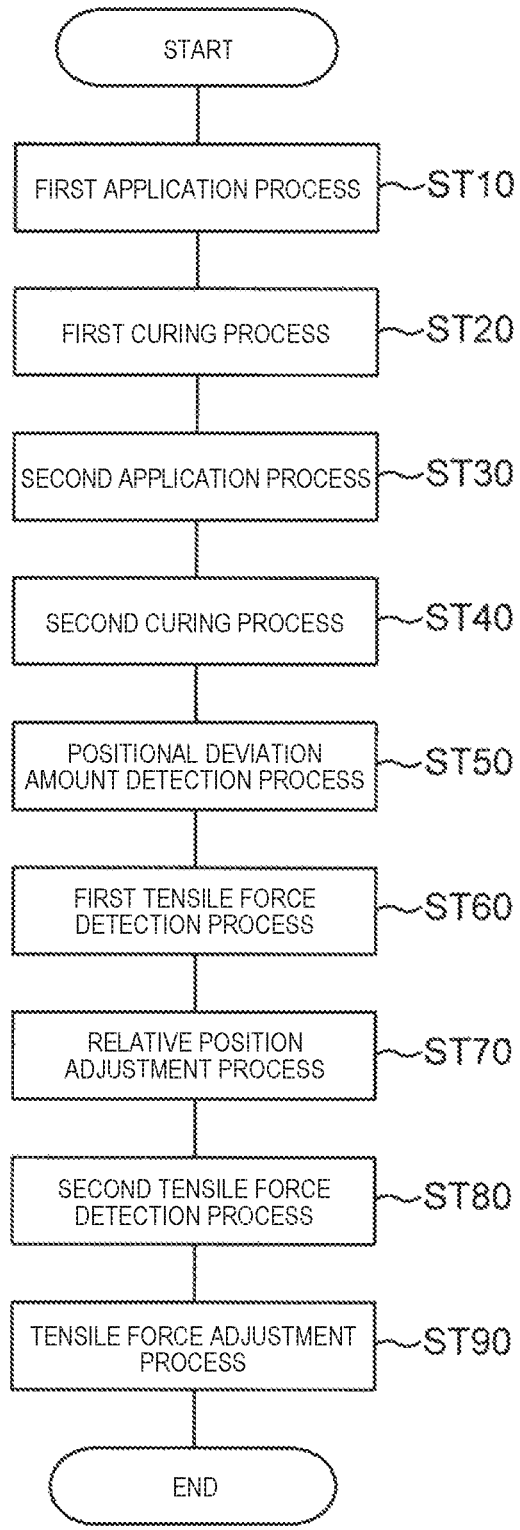
FIG. 5 is a flowchart illustrating a method for manufacturing the film structure according to the embodiment of the disclosure.

Next, a method for manufacturing a film structure will be described with reference to FIG. 5. FIG. 5 is a flowchart illustrating the method for manufacturing a film structure.

First, a first application process ST10 is performed. At this time, the film 1 is transported downstream from the feeding roll 21 through the guide roll 31, the pinch roll 41, and the first tension roll 5a (FIG. 1). In the first application process ST10, the film 1 is pinched between the first coating roll 17a and the first application unit 6a. At this time, the first application unit 6a applies the transfer material 13a to the front surface of the film 1 on one side.

Next, the film 1 is inserted between the first pressurizing roll 7a and the first transfer roll 9a. That is, the film 1 is pinched between the first transfer roll 9a and the first pressurizing roll 7a such that the transfer material 13a is disposed on the side of the first transfer roll 9a. The first pressurizing roll 7a fills the transfer shape 91 with the transfer material 13a by pressurizing the film 1 against the first transfer roll 9a (first transfer process).

Next, a first curing process ST20 is performed. Specifically, the first transfer material 13a applied to the front surface of the film 1 is cured by the first curing section 8a while being pressurized against the first transfer roll 9a using the first pressurizing roll 7a. In other words, the first curing section 8a causes the first transfer material 13a, with which the first transfer roll 9a is filled, to adhere to the film 1 while curing the first transfer material 13a. In this manner, the first transfer material 13a is turned into the first cured film 14a that has been cured in a state in which the first transfer shape 91 has been transferred thereto.

Next, the first mold releasing roll 10a releases the film 1 with the first cured film 14a cured thereon from the first transfer roll 9a (first mold releasing process).

Next, a second application process ST30 is performed. The film 1 is pinched between the second coating roll 17b and the second application unit 6b. At this time, the second application unit 6b applies the second transfer material 13b to the rear surface of the film 1 on the other side, that is, the surface without the first cured film 14a.

Next, the film 1 is inserted between the second pressurizing roll 7b and the second transfer roll 9b. That is, the film 1 is pinched between the second transfer roll 9b and the second pressurizing roll 7b such that the second transfer material 13b is disposed on the side of the second transfer roll 9b. The second pressurizing roll 7b fills the second transfer shape 92 with the second transfer material 13b by pressurizing the film 1 against the second transfer roll 9b (second transfer process).

Next, a second curing process ST40 is performed. Specifically, the second transfer material 13b applied to the rear surface of the film 1 is cured by the second curing section 8b while being pressurized against the second transfer roll 9b by the second pressurizing roll 7b. In other words, the second curing section 8b causes the second transfer material 13b, with which the second transfer roll 9b is filled, to adhere to the film 1 while curing the second transfer material 13b. In this manner, the second transfer material 13b is turned into the second cured film 14b that has been cured in a state in which the second transfer shape 92 has been transferred.

Next, the second mold releasing roll 10b releases the film 1 with the second cured film 14b cured thereon from the second transfer roll 9b (second mold releasing process).

Next, a positional deviation amount detection process ST50 is performed. Specifically, the amount of positional deviation related to the relative position of the second cured film 14b with respect to the first cured film 14a is detected.

Figure 6:
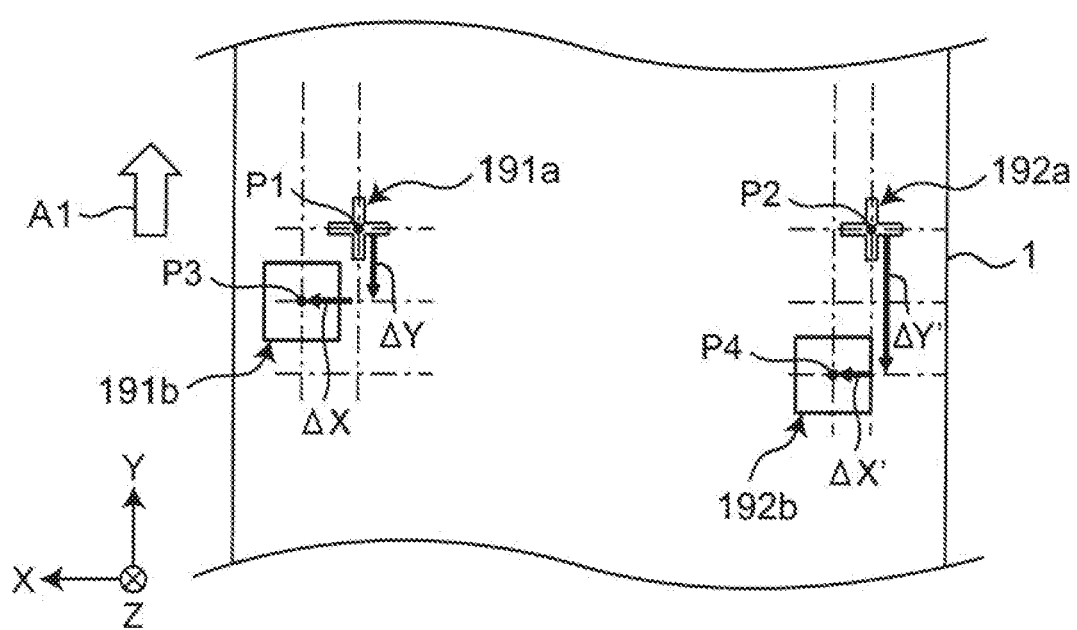
FIG. 6 is an outline schematic view of the film when positional deviation is recognized according to the embodiment of the disclosure.

The positional deviation amount detection process ST50 will be described in detail with reference to FIG. 6. FIG. 6 is an outline schematic view of the film 1 when positional deviation is recognized by the positional deviation amount detection mechanism 15. FIG. 6 illustrates a state in which the film 1 is observed from the rear surface using the positional deviation amount detection mechanism 15. In FIG. 6, the X-axis direction corresponds to the width direction of the film 1. The Y-axis direction corresponds to the traveling direction (longitudinal direction A1) of the film 1, that is, the circumferential direction of the respective transfer rolls 9a and 9b. The Z-axis direction is a direction that mutually perpendicularly intersects with the X axis and the Y axis.

Two alignment marks (omitted in the drawing), for example, are respectively provided in the width direction (the direction at the same position as the circumferential direction) in outer circumferential surfaces of the first transfer roll 9a and the second transfer roll 9b. At this time, the number of marks in the circumferential direction may be any number. In this manner, front surface alignment marks 191a and 192a are formed on the first cured film 14a formed on the front surface of the film 1 as illustrated in FIG. 6. Rear surface alignment marks 191b and 192b are formed on the second cured film 14b formed on the rear surface of the film 1. Note that in FIG. 6, the front surface alignment marks 191a and 192a detected by the positional deviation amount detection mechanism 15 are represented by the solid lines. The positions of the rear surface alignment marks 191b and 192b are recognized by the positional deviation amount detection mechanism 15 with reference to the surface alignment marks 191a and 192a. By providing two alignment marks on the film 1 in the width direction, it is possible to further improve precision of the relative positions of the cured films 14a and 14b on both the surfaces of the film 1.

Centers P1, P2, P3, and P4 of the alignment marks 191a and 192a on the front surface and the alignment marks 191b and 192b on the rear surface of the film 1 are recognized, and $\varDelta X$, $\varDelta Y$, $\varDelta X'$, and $\varDelta Y'$ are detected as amounts of relative positional deviation. That is, $\varDelta X$ in the X direction and $\varDelta Y$ in the Y direction are detected in regard to the amounts of relative positional deviation of the center P3 of the alignment mark 191b with respect to the center P1 of the alignment mark 191a. In regard to the amounts of relative positional deviation of the center P4 of the alignment mark 192b with respect to the center P2 of the alignment mark 192a, $\varDelta X'$ in the X direction and $\varDelta Y'$ in the Y direction are detected.

Note that $\varDelta X>0$ is satisfied in a case in which the alignment marks 191b and 192b are located further in the +X direction than the alignment marks 191a and 192a as references while $\varDelta X<0$ is satisfied in a case in which the alignment marks 191b and 192b are located further in the −X direction than the alignment marks 191a and 192a. Also, $\varDelta Y>0$ is satisfied in a case in which the alignment marks 191b and 192b are located further in the +Y direction than the alignment marks 191a and 192a as references while $\varDelta Y<0$ is satisfied in a case in which the alignment marks 191b and 192b are located further in the −Y direction than the alignment marks 191a and 192a.

Next, a first tensile force detection process ST60 is performed. Specifically, the tensile force detection mechanism 51 detects a tensile force of the film 1 between the first pressurizing roll 7a and the second pressurizing roll 7b before a relative position adjustment process ST70, which will be described below.

Next, the relative position adjustment process ST70 is performed. Specifically, the position or the rotation speed of the second transfer roll 9b is corrected on the basis of the amounts of positional deviation ($\varDelta X$, $\varDelta X'$, $\varDelta Y$, and $\varDelta Y'$) detected in the positional deviation amount detection process ST50, and the relative position detected in the positional deviation amount detection process ST50 is then adjusted. More specifically, the relative position is adjusted such that the amounts of positional deviation ($\varDelta X$, $\varDelta X'$, $\varDelta Y$, and $\varDelta Y'$) detected in the positional deviation amount detection process ST50 are reduced.

In the relative position adjustment process ST70, the correction operation for the position and the rotation speed of the second transfer roll 9b is performed by fixing the front surface of the film 1 at the second pressurizing roll 7b and causing the outer circumferential surface of the second transfer roll 9b to slip only on the transfer material 13b applied to the rear surface of the film 1. That is, in the correction operation for the position and the rotation speed, the second pressurizing roll 7b comes into contact with the first cured film 14a formed on the front surface of the film 1 and rotates together, and the second transfer roll 9b rotates while slipping with respect to the second transfer material 13b applied to the rear surface of the film 1.

The amounts of positional deviation ($\varDelta Y$ and $\varDelta Y'$) in the traveling direction of the film 1 are corrected by moving the rotation axis R1 of the second transfer roll 9b in the height direction and the rotation direction. Specifically, calculation for adjusting the rotation axis R1 of the second transfer roll 9b in the height direction such that $\varDelta Y$ and $\varDelta Y'$ become the same value is performed first.

In regard to the movement of the rotation axis R1 in the height direction, the alignment mark 192b on one end side (the end in the −X direction) moves downstream in the traveling direction (+Y direction) of the film 1 if one end side (the end in the −X direction) of the rotation axis R1 of the second transfer roll 9b is elevated. In the embodiment, when the one end side of the rotation axis R1 of the second transfer roll 9b is elevated, the alignment mark 191b on the other end side (the end in the +X direction) moves upstream in the traveling direction (−Y direction) of the film 1 since the other end side (the end in the +X direction) is lowered.

If one end side of the rotation axis R1 of the second transfer roll 9b is lowered, the alignment mark 192b on the one end side moves upstream in the traveling direction of the film 1. In the embodiment, when the one end side of the rotation axis R1 of the second transfer roll 9b is lowered, the alignment mark 191b on the other end side moves downstream in the traveling direction of the film 1 since the other end side is elevated.

Next, calculation is performed such that the amount of positional deviation in the Y direction, which is obtained as a same value in the calculation, is corrected through acceleration or deceleration of the rotation of the second transfer roll 9b. In regard to the movement in the rotation direction, the alignment marks 191b and 192b move downward in the traveling direction of the film 1 if the rotation speed of the second transfer roll 9b is raised while the alignment marks 191b and 192b move upstream in the traveling direction of the film 1 if the rotation speed of the second transfer roll 9b is lowered.

The amounts of positional deviation ($\varDelta X$ and $\varDelta X'$) in the width direction of the film 1 are corrected by moving the rotation axis R1 of the second transfer roll 9b in the width direction. After the calculation for correcting the rotation axis R1 of the second transfer roll 9b in the height direction is performed (after the correction of the rotation axis R1 in the height direction), the alignment marks 191b and 192b slightly change in the width direction as well. Therefore, the calculation is performed so as to correct the rotation axis R1 of the second transfer roll 9b in the width direction by the amounts of positional deviation incorporating $\varDelta X$, $\varDelta X'$, and the amount of the aforementioned change.

The aforementioned calculation in the correction operation is performed by the control unit C1. After amounts of movement of the rotation axis of the second transfer roll 9b in the height direction, the rotation direction, and the width direction, the control unit C1 performs positional adjustment of the rotation axis of the second transfer roll 9b in the height direction, the rotation direction, and the width direction. The correction operation is linearly performed between the alignment marks in the circumferential direction. It is possible to cause the alignment marks 191b and 192b to approach the alignment marks 191a and 192a as references in the relative position adjustment process ST70.

Next, a second tensile force detection process ST80 is performed. Specifically, the tensile force detection mechanism 51 detects a tensile force of the film 1 between the first pressurizing roll 7*a* and the second pressurizing roll 7*b* after the relative position adjustment process ST70.

Next, a tensile force adjustment process ST90 is performed. The tensile force before correction may be different from the tensile force after the correction due to the correction in the relative position adjustment process ST70. In order to form the cured films 14*a* and 14*b* with high precision while maintaining a constant tensile force, the tensile force of the film 1 is adjusted such that the tensile force of the film 1 detected in the second tensile force detection process ST80 approaches the tensile force of the film 1 detected in the first tensile force detection process ST60. The tensile force of the film 1 is adjusted by providing a command for maintaining the tensile force of the film 1 detected by the tensile force detection mechanism 51 at a constant value to the tensile force adjustment mechanism 71 through the control unit C1.

At this time, the tensile force of the film 1 and a variation in the tensile force are set such that wrinkles and a variation in stretching and contraction of the film 1 are minimized. A setting value for the tensile force of the film 1 is set within a range of equal to or greater than 3 N and equal to or less than 15 N, for example. Also, the variation in tensile force of the film 1 is equal to or less than ±0.125 N, for example.

A film structure is manufactured by performing the processes as described above.

According to the method and the apparatus D1 for manufacturing a film structure of the embodiment, the following advantages can be achieved.

In the method for manufacturing a film structure according to the embodiment, the positional deviation amount detection process ST50 is a process of detecting the amounts of positional deviation ($\Delta$X, $\Delta$X', $\Delta$Y, and $\Delta$Y') related to the relative position of the second cured film 14*b* with respect to the first cured film 14*a*. The relative position adjustment process ST70 is a process of correcting the position or the rotation speed of the second transfer roll 9*b* and adjusting the relative position such that the amounts of positional deviation detected in the positional deviation amount detection process ST50 are reduced. The first tensile force detection process ST60 and the second tensile force detection process ST80 are processes of detecting the tensile force of the film 1 between the first pressurizing roll 7*a* and the second pressurizing roll 7*b* before and after the relative position adjustment process ST70, respectively. The tensile force adjustment process ST90 is a process of adjusting the tensile force of the film 1 such that the tensile force of the film 1 detected in the second tensile force detection process ST80 approaches the tensile force of the film 1 detected in the first tensile force detection process ST60.

In the apparatus D1 for manufacturing a film structure according to the embodiment, the positional deviation amount detection mechanism 15 detects the amount of positional deviation of the relative position of the second cured film 14*b* with respect to the first cured film 14*a*. The correction mechanism 93 corrects the position or the rotation speed of the second transfer roll 9*b*. The tensile force detection mechanism 51 detects a tensile force of the film 1 between the first pressurizing roll 7*a* and the second pressurizing roll 7*b*. The tensile force adjustment mechanism 71 adjusts the tensile force of the film 1 between the first pressurizing roll 7*a* and the second pressurizing roll 7*b*. The control unit C1 controls the correction mechanism 93 such that the amount of positional deviation is reduced and controls the tensile force adjustment mechanism 71 such that the tensile force of the film 1 detected by the tensile force detection mechanism 51 after the correction performed by the correction mechanism 93 approaches the tensile force of the film 1 detected by the tensile force detection mechanism 51 before the correction.

According to the manufacturing method and the manufacturing apparatus D1, it is possible to dispose both the cured films 14*a* and 14*b* at desired relative positions by reducing the amount of positional deviation of the second cured film 14*b* with respect to the first cured film 14*a*. Even if the position or the rotation speed of the second transfer roll 9*b* is changed to reduce the amount of positional deviation, it is possible to constantly maintain the tensile force of the film 1 between the first pressurizing roll 7*a* and the second pressurizing roll 7*b* to the maximum extent. Therefore, it is possible to improve precision of the relative positions of the cured films 14*a* and 14*b* on both the surfaces of the film 1 while securing transfer quality on both the surfaces of the film 1.

In the method for manufacturing a film structure according to the embodiment, the amount of positional deviation in the traveling direction of the film 1 is reduced by correcting the rotation speed of the second transfer roll 9*b* in the relative position adjustment process ST70.

In the apparatus D1 for manufacturing a film structure according to the embodiment, the correction mechanism 93 corrects the rotation speed of the second transfer roll 9*b*.

According to the manufacturing method and the manufacturing apparatus D1, it is possible to easily adjust the transfer position of the second cured film 14*b* in the traveling direction of the film 1 by correcting the rotation speed of the second transfer roll 9*b*. Therefore, it is possible to easily reduce the amount of positional deviation in the traveling direction of the film 1.

In the method for manufacturing a film structure according to the embodiment, the rotation speeds of the first transfer roll 9*a* and the second transfer roll 9*b* are synchronized. In the relative position adjustment process ST70, the synchronization of the rotation speeds of the first transfer roll 9*a* and the second transfer roll 9*b* is released when the rotation speed of the second transfer roll 9*b* is corrected. By correcting the rotation speed of the second transfer roll 9*b* in this state, the amount of positional deviation in the traveling direction of the film 1 is reduced.

In the apparatus D1 for manufacturing a film structure according to the embodiment, the control unit C1 synchronizes the rotation speeds of the first transfer roll 9*a* and the second transfer roll 9*b* and releases the synchronization of the rotation speeds of the first transfer roll 9*a* and the second transfer roll 9*b* when the rotation speed of the second transfer roll 9*b* is corrected.

According to the manufacturing method and the manufacturing apparatus D1, it is possible to change the rotation speed of the second transfer roll 9*b* with respect to the first transfer roll 9*a* by releasing the synchronization of the rotation speeds of the first transfer roll 9*a* and the second transfer roll 9*b* when the rotation speed of the second transfer roll 9*b* is corrected. Therefore, it is possible to easily reduce the amount of positional deviation in the traveling direction of the film 1. Also, it is possible to constantly maintain the relative positions between the transfer position of the first cured film 14*a* and the transfer position of the second cured film 14*b* by synchronizing the rotation speeds of the first transfer roll 9*a* and the second transfer roll 9*b* when the correction of the rotation speed of the second transfer roll 9*b* is not performed.

In the method for manufacturing a film structure according to the embodiment, the amount of positional deviation is reduced by correcting the position of the second transfer roll 9b in the relative position adjustment process.

In the apparatus D1 for manufacturing a film structure according to the embodiment, the correction mechanism 93 corrects the position of the second transfer roll 9b.

According to the manufacturing method and the manufacturing apparatus D1, it is possible to correct a pressurizing position of the second transfer roll 9b pressurized by the second pressurizing roll 7b by correcting the position of the second transfer roll 9b. Therefore, it is possible to easily adjust the transfer position of the second cured film 14b and to easily reduce the amount of positional deviation.

In the method for manufacturing a film structure according to the embodiment, the amount of positional deviation in the width direction of the film 1 is reduced by correcting the position of the second transfer roll 9b in the width direction in the relative position adjustment process ST70.

In the apparatus D1 for manufacturing a film structure according to the embodiment, the correction mechanism 93 corrects the position of the second transfer roll 9b in the width direction.

According to the manufacturing method and the manufacturing apparatus D1, it is possible to easily adjust the transfer position of the second cured film 14b in the width direction of the film 1 by correcting the position of the second transfer roll 9b in the width direction. Therefore, it is possible to easily reduce the amount of positional deviation in the width direction of the film 1.

In the method for manufacturing a film structure according to the embodiment, the position of the second transfer roll 9b in the height direction is corrected to reduce the amount of positional deviation in the traveling direction of the film 1 in the relative position adjustment process ST70. The amount of positional deviation in the traveling direction of the film 1 is reduced by causing the outer circumferential surface of the second transfer roll 9b to slip in the height direction with respect to the transfer material 13b applied to the rear surface of the film 1.

In the apparatus D1 for manufacturing a film structure according to the embodiment, the correction mechanism 93 causes the outer circumferential surface of the second transfer roll 9b to slip in the height direction with respect to the transfer material 13b applied to the rear surface of the film 1 by correcting the position of the second transfer roll 9b in the height direction.

According to the manufacturing method and the manufacturing apparatus D1, it is possible to easily adjust the transfer position of the second cured film 14b in the traveling direction of the film 1 by adjusting the position of the second transfer roll 9b in the height direction. Therefore, it is possible to easily reduce the amount of positional deviation in the traveling direction of the film 1.

In the method for manufacturing a film structure according to the embodiment, it is possible to reduce the amount of positional deviation by causing the outer circumferential surface of the second transfer roll 9b to slip above the transfer material 13b applied to the rear surface of the film 1 in the relative position adjustment process ST70.

According to the manufacturing method, it is possible to easily adjust the transfer position of the second cured film 14b by causing the outer circumferential surface of the second transfer roll 9b to slip above the transfer material 13b. Therefore, it is possible to easily reduce the amount of positional deviation.

In the manufacturing apparatus D1 according to the embodiment, the film thickness of the second transfer material 13b transferred by the second transfer roll 9b is, for example, equal to or greater than 0.5 μm and equal to or less than 10 μm. By not setting the film thickness of the second transfer material 13b to be excessively thin, it is possible to more reliably transfer the transfer shape 92 of the second transfer roll 9b thereto. Further, it is possible to easily cause the second transfer roll 9b to slip with respect to the second transfer material 13b by not setting the film thickness of the second transfer material 13b to be excessively thick.

Note that the disclosure is not limited to the aforementioned embodiment and can be implemented in other various aspects. Although the rotation speed of the first transfer roll 9a and the rotation speed of the second transfer roll 9b are synchronized through the control unit C1 in the embodiment, the disclosure is not limited thereto. That is, the rotation speed of the first transfer roll 9a and the rotation speed of the second transfer roll 9b may be different from each other. It is possible to reduce the amounts of the positional deviation ($\Delta Y$, $\Delta Y'$) in the traveling direction of the film 1 by adjusting only the rotation speed of the second transfer roll 9b.

Although there is a description that the position and the rotation speed of the second transfer roll 9b are corrected, either the position or the rotation speed of the second transfer roll 9b may be corrected.

Although there is a description that the pressurizing rolls 7a and 7b are provided so as to be aligned in the horizontal direction with respect to the transfer rolls 9a and 9b, respectively, the disclosure is not limited thereto. The second pressurizing roll 7b may be provided in the vertical direction with respect to the second transfer roll 9b, for example.

Although there is a description that the two alignment marks are provided in the width direction in each of the outer circumferential surfaces of the first transfer roll 9a and the second transfer roll 9b, the number of alignment marks is not limited thereto. That is, the number of alignment marks may be one, three, or more.

Also, the alignment marks may not be provided in the width direction in each of the outer circumferential surfaces of the first transfer roll 9a and the second transfer roll 9b. That is, the alignment marks may be provided with deviation in the width direction, for example.

Although there is a description that the first pressurizing roll 7a is a roll that is not provided with a drive source, the first pressurizing roll 7a may be a roll provided with a drive source such as a motor, for example.

Also, the first transfer roll 9a may have a mechanism capable of adjusting the relative position with respect to the film 1. The first transfer roll 9a may have a position correction mechanism for movement in the width direction and the height direction similarly to the second transfer roll 9b, for example.

Although there is a description that the correction operation in the height direction is performed by causing one side (the right side in FIG. 3) of the rotation axis R1 of the second transfer roll 9b in the width direction to move in the height direction, the disclosure is not limited thereto. That is, the correction operation in the height direction may be performed on both sides of the rotation axis R1 in the width direction.

Also, a determination process ST100 of making determination on the basis of the amount of positional deviation detected in the positional deviation amount detection process ST50 may be included after the positional deviation amount detection process ST50 and before the relative position adjustment process ST70. In the determination process ST100, whether or not the amount of positional deviation is smaller than a threshold value set in advance is determined. The relative position adjustment process ST70 is performed in a case in which the amount of positional deviation is greater than the threshold value in the determination process ST100, and the relative position adjustment process ST70 is not performed in a case in which the amount of positional deviation is smaller than the threshold value. The series of processes from the positional deviation amount detection process ST50 to the tensile force adjustment process ST90 are repeatedly performed until it is determined that the amount of positional deviation is smaller than the threshold value in the determination process ST100. In this manner, it is possible to further improve prevision of the relative positions of the cured films 14*a* and 14*b* on both the surfaces of the film 1.

Although the disclosure has sufficiently been described in regard to the preferred embodiment with reference to the accompanying drawings, it is obvious for those skilled in the art that various modifications and changes can be made. Such modifications and changes are to be understood as being included in the scope of the disclosure based on the appended claims without departing from the scope. Also, changes in combinations and orders of the elements in the embodiment can be realized without departing from the scope and the gist of the disclosure.

The method and apparatus for manufacturing a film structure according to the disclosure are useful in fields of optical components and semiconductor components, for example, since it is possible to highly precisely form fine shapes on both surfaces of a film.

What is claimed is:

1. A method for manufacturing a film structure obtained by transferring a transfer material to both surfaces of a successively traveling film and curing the transfer material, the method comprising:
    a first application process of applying the transfer material containing an ultraviolet curable resin to a front surface of the film;
    a first curing process of pressurizing the front surface of the film against a first transfer roll with a first pressurizing roll and curing the transfer material applied to the front surface of the film with ultraviolet rays, thereby forming a first cured film;
    a second application process of applying the transfer material containing an ultraviolet curable resin to a rear surface of the film;
    a second curing process of pressurizing the rear surface of the film against a second transfer roll with a second pressurizing roll and curing the transfer material applied to the rear surface of the film with ultraviolet rays, thereby forming a second cured film;
    a positional deviation amount detection process of detecting an amount of positional deviation related to a relative position of the second cured film with respect to the first cured film;
    a relative position adjustment process of correcting a position or a rotation speed of the second transfer roll to adjust the relative position such that the amount of positional deviation detected in the positional deviation amount detection process is reduced;
    a first tensile force detection process and a second tensile force detection process of respectively detecting a tensile force of the film between the first pressurizing roll and the second pressurizing roll before and after the relative position adjustment process; and
    a tensile force adjustment process of adjusting the tensile force of the film such that the tensile force of the film detected in the second tensile force detection process approaches the tensile force of the film detected in the first tensile force detection process.

2. The method for manufacturing a film structure according to claim 1,
    wherein the amount of positional deviation in a traveling direction of the film is reduced by correcting the rotation speed of the second transfer roll in the relative position adjustment process.

3. The method for manufacturing a film structure according to claim 2,
    wherein the rotation speeds of the first transfer roll and the second transfer roll are synchronized, and
    in the relative position adjustment process, the amount of positional deviation in the traveling direction of the film is reduced by correcting the rotation speed of the second transfer roll in a state in which the synchronization of the rotation speeds of the first transfer roll and the second transfer roll is released when the rotation speed of the second transfer roll is corrected.

4. The method for manufacturing a film structure according to claim 1,
    wherein the amount of positional deviation is reduced by correcting the position of the second transfer roll in the relative position adjustment process.

5. The method for manufacturing a film structure according to claim 4,
    wherein the amount of positional deviation in a width direction of the film is reduced by correcting the position of the second transfer roll in the width direction in the relative position adjustment process.

6. The method for manufacturing a film structure according to claim 4,
    wherein the amount of positional deviation in the traveling direction of the film is reduced by correcting the position of the second transfer roll in a height direction and causing an outer circumferential surface of the second transfer roll to slip in the height direction relative to the transfer material applied to the rear surface of the film in the relative position adjustment process.

7. The method for manufacturing a film structure according to claim 1,
    wherein the amount of positional deviation is reduced by causing an outer circumferential surface of the second transfer roll to slip above the transfer material applied to the rear surface of the film in the relative position adjustment process.

8. An apparatus for manufacturing a film structure obtained by transferring a transfer material to both surfaces of a successively traveling film and curing the transfer material, the apparatus comprising:
    a first application unit and a second application unit that respectively apply the transfer material containing an ultraviolet curable resin to the film;
    a first transfer roll and a second transfer roll that respectively have transfer shapes on front surfaces thereof;
    a first pressurizing roll that pressurizes the transfer material applied to a front surface of the film by the first application unit against the first transfer roll;
    a first curing section that cures the transfer material pressurized by the first pressurizing roll with ultraviolet rays, thereby forming a first cured film;

a second pressurizing roll that pressurizes the transfer material applied to a rear surface of the film by the second application unit against the second transfer roll;

a second curing section that cures the transfer material pressurized by the second pressurizing roll with ultraviolet rays, thereby forming a second cured film;

a positional deviation amount detection mechanism that detects an amount of positional deviation related to a relative position of the second cured film with respect to the first cured film;

a correction mechanism that corrects a position or a rotation speed of the second transfer roll;

a tensile force detection mechanism that detects a tensile force of the film between the first pressurizing roll and the second pressurizing roll;

a tensile force adjustment mechanism that adjusts the tensile force of the film; and a control unit that controls the correction mechanism such that the amount of positional deviation is reduced and controls the tensile force adjustment mechanism such that the tensile force of the film detected by the tensile force detection mechanism after the correction performed by the correction mechanism approaches the tensile force of the film detected by the tensile force detection mechanism before the correction.

9. The apparatus for manufacturing a film structure according to claim 8,
wherein the correction mechanism corrects the rotation speed of the second transfer roll.

10. The apparatus for manufacturing a film structure according to claim 9,
wherein the control unit causes rotation speeds of the first transfer roll and the second transfer roll to be synchronized and releases the synchronization of the rotation speeds of the first transfer roll and the second transfer roll when the rotation speed of the second transfer roll is corrected.

11. The apparatus for manufacturing a film structure according to claim 8,
wherein the correction mechanism corrects the position of the second transfer roll.

12. The apparatus for manufacturing a film structure according to claim 11,
wherein the correction mechanism corrects the position of the second transfer roll in a width direction.

13. The apparatus for manufacturing a film structure according to claim 11,
wherein the correction mechanism causes an outer circumferential surface of the second transfer roll to slip in a height direction relative to the transfer material applied to the rear surface of the film by correcting the position of the second transfer roll in the height direction.

14. An apparatus for manufacturing a film structure obtained by transferring a transfer material to both surfaces of a successively traveling film and curing the transfer material, the apparatus comprising:

a first die and a second die that respectively apply the transfer material containing an ultraviolet curable resin to the film;

a first transfer roll and a second transfer roll that respectively have transfer shapes on front surfaces thereof;

a first pressurizing roll that pressurizes the transfer material applied to a front surface of the film by the first die against the first transfer roll;

a first ultraviolet light source that cures the transfer material pressurized by the first pressurizing roll with ultraviolet rays, thereby forming a first cured film;

a second pressurizing roll that pressurizes the transfer material applied to a rear surface of the film by the second die against the second transfer roll;

a second ultraviolet light source that cures the transfer material pressurized by the second pressurizing roll, thereby forming a second cured film;

a camera that detects an amount of positional deviation related to a relative position of the second cured film with respect to the first cured film based upon alignment marks imparted on the second cured film;

a tension sensor that detects a tensile force of the film between the first pressurizing roll and the second pressurizing roll; and a control unit configured to adjust a position or a rotation speed of the second transfer roll based upon the detected positional deviation and the detected tensile force such that the amount of positional deviation is reduced and the tensile force of the film detected by the tension sensor after the adjusting the position or the rotation speed of the second transfer roll approaches the tensile force of the film detected by the tensile force detection mechanism before the adjusting.

* * * * *